United States Patent [19]

MacEwen et al.

[11] 3,910,718

[45] Oct. 7, 1975

[54] LIMITED DEFLECTION FLEXIBLE BLADED FAN FOR USE WITH VISCOUS SHEAR CLUTCH

[75] Inventors: Ralph Miller MacEwen; Richard Paul Beldam, both of Chatham, Canada

[73] Assignee: Fram Corporation, East Providence, R.I.

[22] Filed: Mar. 18, 1974

[21] Appl. No.: 452,074

[52] U.S. Cl. ............................... 416/132; 416/240
[51] Int. Cl.² ........................................ F04D 29/38
[58] Field of Search ................ 416/132, 132 A, 240

[56] References Cited
UNITED STATES PATENTS

| | | | |
|---|---|---|---|
| 2,374,342 | 4/1945 | Gaubatz | 416/132 |
| 3,044,557 | 7/1962 | Posh | 416/132 |
| 3,289,924 | 12/1966 | Weir | 416/132 X |
| 3,406,760 | 10/1968 | Weir | 416/240 |
| 3,490,686 | 1/1970 | Weir | 416/132 X |
| 3,679,321 | 7/1972 | Strick | 416/132 |
| 3,773,435 | 11/1973 | Wooden | 416/132 |
| 3,836,284 | 9/1974 | De Jong | 416/132 |

Primary Examiner—Everette A. Powell, Jr.

[57] ABSTRACT

For use with a viscous shear clutch, a flexible bladed fan having a rigid reinforcement member overlying the upstream side of each flexible blade thereof and extending rearward at an acute angle to the plane of fan rotation a distance greater than 50% of the blade width.

15 Claims, 6 Drawing Figures

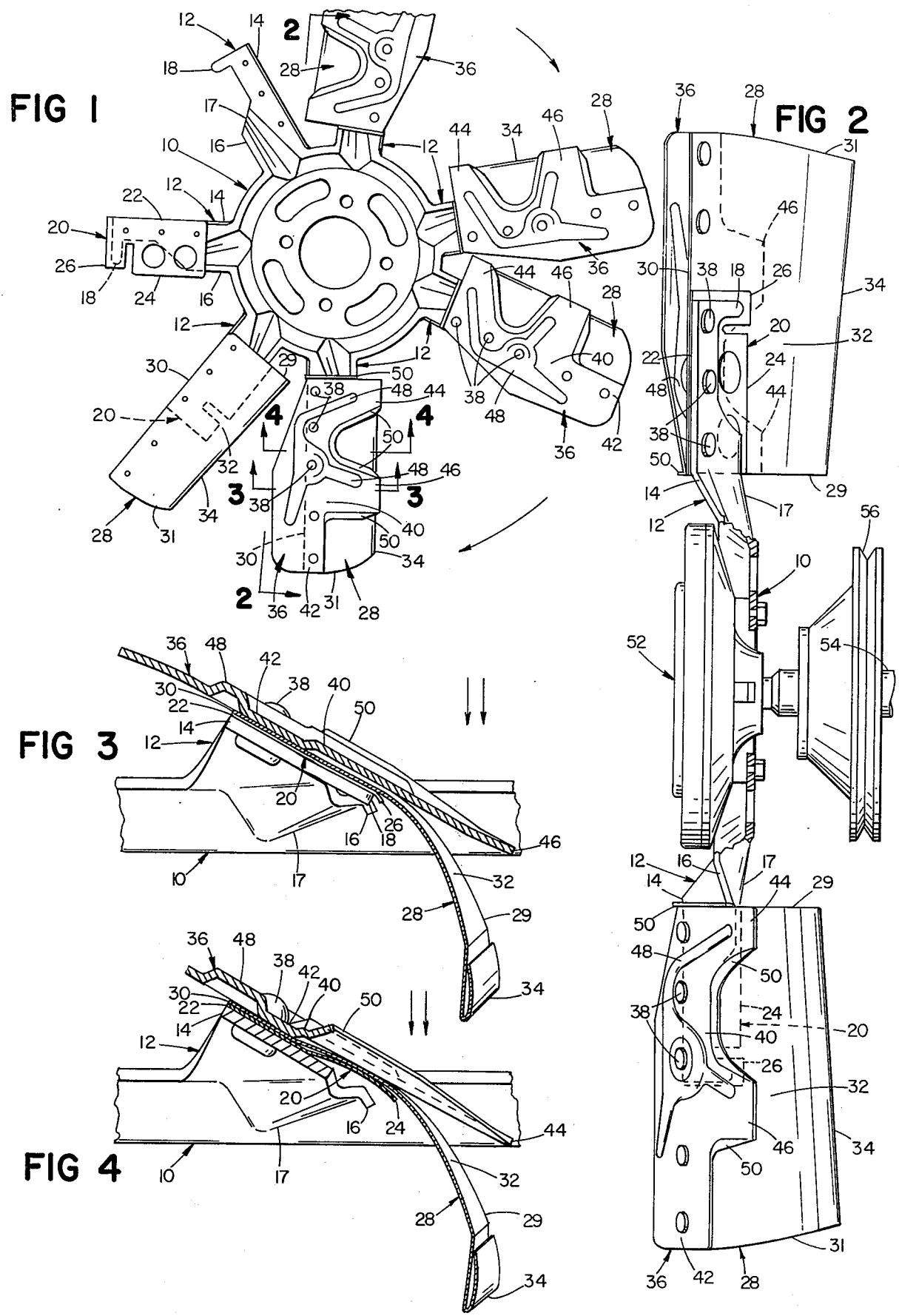

LIMITED DEFLECTION FLEXIBLE BLADED FAN FOR USE WITH VISCOUS SHEAR CLUTCH

BACKGROUND OF THE INVENTION

1. Field of the Invention

This invention relates to automotive cooling fans and more particularly to a fan particularly adapted for use with a viscous shear clutch.

2. Description of the Prior Art

The combination of automotive cooling fans and viscous shear clutches is known. Prior to the commercialization of flexible bladed fans, rigid bladed fans were employed with viscous shear clutches to reduce at high engine speed power drain by the fan and air flow pumped by the fan relative to a rigid bladed fan without a clutch. An inherent disadvantage of the rigid bladed fan-viscous shear clutch combination, however, was the low terminal speed of the fan in the combination, resulting in a high rate of slip of the fan relative to the clutch input at high engine speeds. The slip between the clutch and the rigid bladed fan resulted in the generation of heat which had to be dissipated by the clutch and which led to clutch durability problems.

After the commercialization of flexible-bladed fans, which to a major extent supplanted the rigid bladed fan-viscous shear clutch combination, it was suggested that the substitution of a flexible bladed fan in combination with the viscous shear clutch would mitigate the problem encountered with a rigid bladed fan in the combination. Thus, since the blades decamber as rotational speed increases, less torque is required to drive the fan, the fan thus achieves a higher speed than the rigid bladed fan for a given clutch input speed, hence slippage at high engine speeds and concomitantly heat generation is reduced relative to the combination with a rigid bladed fan.

It has been found, however, that due to the inherent torque characteristics of a viscous shear clutch, taken together with normal manufacturing tolerances, the output speed of a standard flexible-bladed fan in combination with a viscous shear clutch is unpredictable at best over a wide range for a given clutch input speed particularly at high speeds. Additionally, the inherently higher output speed of the combination results in unnecessary fan noise. A standard flexible bladed fan fails to achieve a terminal output speed in the combination, thus, together with the higher output speed, necessitating the use of a heavier fan of greater integral strength than otherwise would be required in the combination in order to insure fan durability and safety.

SUMMARY OF THE INVENTION

It is accordingly a principal object of this invention to provide a fan for use with a viscous shear clutch which combines the advantages of both a flexible-bladed and a rigid-bladed fan, i.e., a fan which reduces clutch slippage and heat generation while at the same time having, in the combination, a terminal speed and a relatively accurately determinable output speed at a given clutch input speed.

The invention features, for use with a viscous shear clutch, a fan having flexible blades which decamber as rotational speed increases and a reinforcement member on the upstream side of the blade. The reinforcement member extends transversely of the blade at an acute angle to the plane of rotation of the fan. The reinforcement member extends transversely from the connection of the blade to the fan to a position along a line extending generally radially along the blade, the reinforcement member, at radially spaced positions adjacent the inner and outer blade side edges along said line, spaced transversely from said connection a distance greater than 50% of the transverse extent of the blade trailing edge from said connection, whereby the reinforcement member restrains decambering of the blade beyond the acute angle.

In a preferred embodiment the radially spaced positions of said reinforcement member along said line are spaced more than 50% of the blade radial extent. In a preferred embodiment, also the reinforcement member comprises a continuous web along the blade trailing edge and integral radially spaced fingers transversely extending toward the blade trailing edge. In a preferred embodiment, the reinforcement member, additionally, is connected against the blade in one plane and rearwardly thereof extends at said acute angle in a second plane upstream of said one plane; preferably said one and second planes are parallel.

BRIEF DESCRIPTION OF THE DRAWINGS

Other objects, features and advantages of this invention will be apparent to those skilled in the art from the following detailed description of a preferred embodiment thereof taken together with the accompanying drawings in which:

FIG. 1 is a plan view of a fan spider showing elements of the fan blade assembly mounted in series on certain of the spider arms and showing fully assembled fan blade assemblies on the other arms;

FIG. 2 is an enlarged elevation view of the fan shown in FIG. 1, taken along the line 2—2 thereof, mounted on a viscous shear clutch;

FIGS. 3 and 4 are enlarged sectional views respectively taken along the lines 3—3 and 4—4 of FIG. 1;

DESCRIPTION OF THE PREFERRED EMBODIMENT

Figure 5:
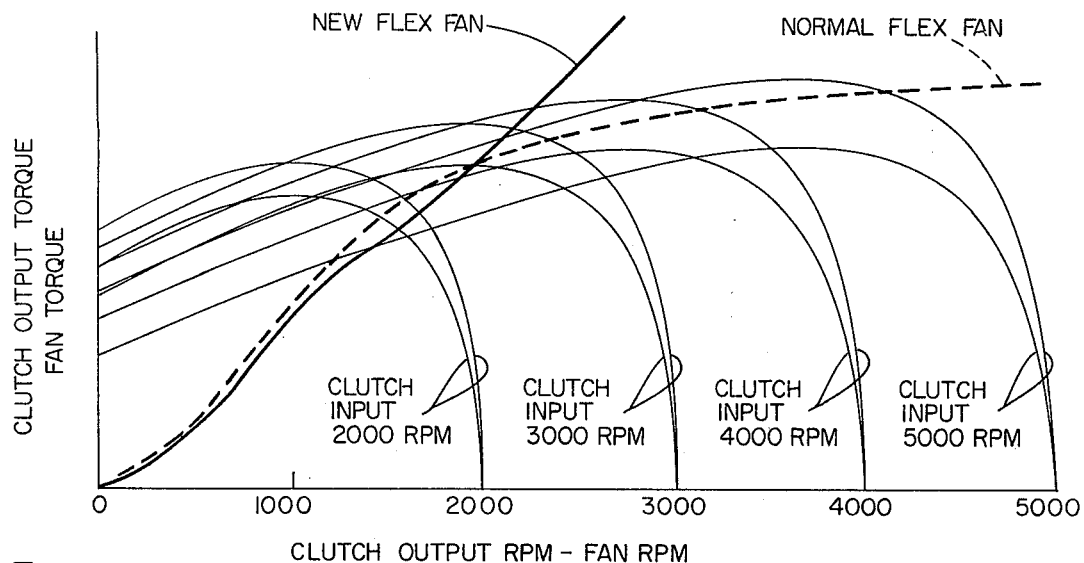
FIG. 5 is a graph of clutch output torque and fan torque plotted against clutch output r.p.m., for given clutch input r.p.m.'s, and fan r.p.m.

With reference now to the drawings and more particularly to FIG. 1 thereof, there is shown an engine cooling fan adapted for use in a motor vehicle. The fan comprises a spider having a central planar hub 10 with integral asymmetrically disposed arms 12 extending generally radially therefrom. The fan is rotatable in a plane about a central axis, rotating in the direction indicated by the arrow in FIG. 1. As best shown in FIGS. 3 and 4 each arm 12 has a twisted section at its root adjacent hub 10 so that the plane of each arm is at an acute angle to the plane of rotation, e.g. about 31°. The leading portion 14 of each arm 12, defined by the direction of fan rotation, is radially continuous. The trailing portion of each arm 12 is discontinuous comprising a trailing root section 16 connected to hub 10 and having a strengthening rib 17 extending therebetween, the trailing portion of root section 16 in the same plane as arm leading portion 14. The trailing portion of each arm 12 also comprises a biasing finger 18 radially spaced outwardly from root section 16, finger 18 bent slightly upstream from the plane of arm leading portion 14. The spider including hub 10 and arms 12 is made of relatively rigid steel (SAE 950Ak, 0.120 inch thick).

Mounted on the upstream side of each arm 12, defined by the direction of airflow, indicated by arrows in FIGS. 2, 3 and 4, is a damper plate 20 of thin flexible resilient steel (AISI 301 stainless steel, 0.013 inch thick). Damper plate 20, like arm 12 is radially continuous along a leading portion 22 and discontinuous along its trailing portion. The trailing portion of damper 20 comprises a damping portion 24 overlying the root section 16 of arm 12 and a finger cover 26 overlying finger 18 of arm 12. The finger cover 26 lies against finger 18 and extends transversely slightly beyond the trailing edge thereof being curved in a downstream direction at said trailing edge best shown in FIG. 4. The damping portion 24 is preformed to be curved upstream and then is reversely curved and is thus spaced upstream from root section 16, best shown in FIG. 4.

A fan blade 28 is mounted on the upstream side of arm 12 and damper plate 20. The fan blade is also made of thin flexible resilient steel (AISI 301 stainless steel, 0.013 inch thick). Blade 28 extends radially along and beyond arm 12 and damper plate 20 and extends transversely between a leading portion 30 to a trailing portion 32, behind arm 12, terminating in a trailing edge 34 spaced rearwardly of arm 12. The blade 28 is curved from arm 12 to a position downstream thereof at the trailing edge 34, thereby presenting a transversely extending convex surface on the upstream side of blade 28 at the trailing portion 32 thereof.

Mounted on the upstream side of blade 28 is a reinforcement member 36 of relatively rigid material (SAE 052 aluminum, 0.060 inch thick). Reinforcement member 36 extends as a continuous web radially along the leading portion 30 of blade 28 thereagainst and transversely forward thereof and of arm 12. Rivets 38 extend through reinforcement member 36, blade 28, damper plate 20 and arm 12, securing the assembly together. Behind the radial line of rivets 38, reinforcement member 36 is stepped upstream to a trailing portion 40 in second plane parallel to the plane of arm 12 and the plane of leading portion 42 of member 36 at which it is connected against blade 28. The reinforcement member 36, parallel to the plane of arm 12, is thus at the same acute angle to the plane of fan rotation both at its leading and trailing portions 40, 42. Behind the step in reinforcement member 36, the member 36 has a pair of integral, radially spaced fingers 44, 46 respectively adjacent the inner and outer side edges 29, 31 of blade 28, the radial width of reinforcement member 36 at fingers 44, 46, more than 50% of blade 28, fingers 44, 46 extending transversely toward the blade trailing portion 32 overlying the convex surface of blade 28 and progressively spaced a greater distance therefrom toward the blade trailing portion. The rigid reinforcement member fingers 44, 46 extend rearwardly from rivets 38 toward the blade trailing edge 34 to a trailing position along a line at a distance greater than 50% of the distance from the rivets 38 to the blade trailing edge (about 70% in the illustrated embodiment). To enhance the strength and rigidity of the reinforcement member 36, rib 48 and upturned flanges 50 are provided.

As illustrated in FIG. 2, the assembled fan is mounted on a viscous shear clutch 52 which in turn is mounted on a shaft 54 adapted to be driven by sheave 56. Finger 18 of arm 12 prestresses blade 28 such that it assumes, in a static condition, approximately the same projected width, i.e., height from fan front to rear, as it will have at 1,000 r.p.m. Damper plate 20 also prestresses the blade pushing it against reinforcement member 36, causing the blade in a static condition to cant as illustrated in FIGS. 3 and 4. As the blade vibrates during rotation, damper plate 20 contacts the blade 28 to dampen deleterious vibrations.

In operation, sheave 56 is rotated to drive shaft 54 and the input side of clutch 52. The fan is connected to the output side of clutch 52 which is rotated by the shearing action of a viscous liquid coupling the input and output sides of the clutch 52. Some slippage occurs between the input and output sides of the clutch 52. Until the fan speed reaches about, e.g., 1,000 r.p.m., as aforementioned, because of the blade prestressing, little change in fan blade 28 shape occurs. After fan speed reaches 1,000 r.p.m., however, blade 28 decambers rapidly in an upstream direction, the speed of decambering enhanced by the thin material employed in the blade and by the stepped reinforcement member 36 which removes the usual restraint behind the rivet line. Thus the blade decambers until it fully engages reinforcement member 36 at about, e.g., 2,000 r.p.m., after which the blade is restrained from further deflection by the reinforcement member 36.

Because the blade 28 of the fan is restrained from deflecting beyond the acute angle of reinforcement member 36, the torque required to drive the fan continues to increase relatively linearly whereas, in a normal flex fan the rate of increase of torque required to drive the fan drops off considerably at 2,000 r.p.m. and above. This is illustrated in FIG. 5 by typical fan torque v. fan r.p.m. curves drawn for the fan of the present invention (heavy solid line) and for a typical flexible bladed fan (broken line). Also shown in FIG. 5 are torque curves plotting clutch output torque v. clutch output r.p.m. at given clutch input r.p.m.'s; two curves are plotted for each clutch input r.p.m. to show extremes encountered with normal manufacturing tolerances and with normal environmental changes. Where the fan torque curves intersect the clutch torque curves in FIG. 5 the fan r.p.m. for a given clutch input r.p.m. can be determined.

Figure 6:
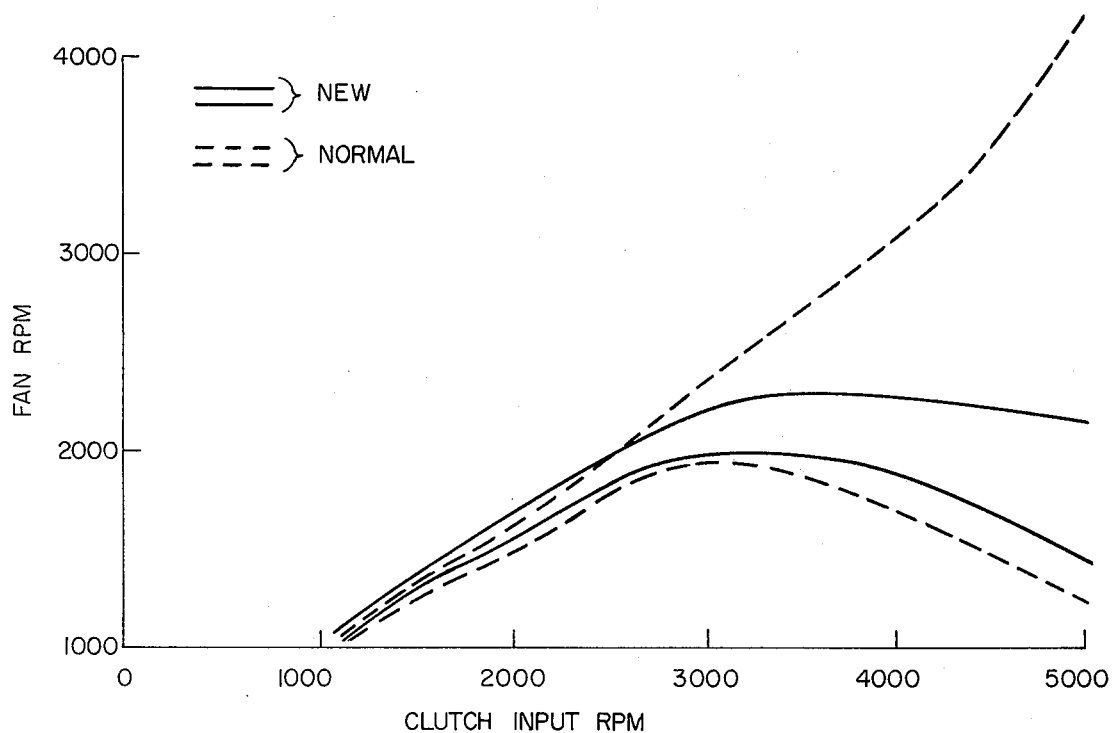
FIG. 6 is a graph of fan r.p.m. plotted against clutch input r.p.m. for the fans graphed in FIG. 5.

Fan r.p.m. v. clutch input r.p.m., extrapolated from FIG. 5, is plotted in FIG. 6 for the two fans, each plotted as two lines, indicating the extremes resulting from the same manufacturing tolerances and environmental factors. It is to be observed first that the fan according to the present invention in combination with a viscous shear clutch has a terminal speed regardless of clutch input speed whereas the normal flex fan, taking a median line (not shown), has no terminal speed. Second, the speed variations for a fan according to the present invention in combination with a viscous shear clutch occur over a fairly narrow range, whereas speed variations of a normal flex fan in the combination occur over a wide range.

Other embodiments of this invention will occur to those skilled in the art which are within the scope of the following claims.

What is claimed is:

1. In an automotive cooling fan, rotatable in a plane, for use with a viscous shear clutch, said fan having a hub and a plurality of fan blade assemblies each comprising an arm extending radially outwardly from said hub and a flexible resilient blade having a leading portion, defined by the direction of fan rotation, extending radially along said arm and connected to said arm radially therealong, said blade having radially spaced inner and outer side edges and extending transversely to a trailing portion thereof terminating in a trailing edge spaced rearwardly of said arm and said blade curved from said arm to a position at said trailing edge downstream of said arm, relative to the direction of airflow from said fan, said blade presenting a transversely extending convex surface on the upstream side thereof, said trailing portion and said trailing edge decambering to a relatively more upstream position as rotational speed increases, and a rigid reinforcement member radially connected to and against the upstream side of said blade leading portion, said reinforcement member extending radially along said leading portion and transversely therefrom toward said blade trailing portion overlying said convex surface, said reinforcement member spaced a progressively greater distance from said blade convex surface toward the trailing portion of said blade, the improvement in which:

said reinforcement member extends transversely, at an acute angle to said plane, to a trailing position along a line extending generally radially along said blade and said reinforcement member at radially spaced positions along said line respectively adjacent said inner and outer side edges, said line spaced transversely from the connection of said reinforcement member to said blade a distance greater than 50% of the transverse extent of said blade to said blade trailing edge from said connection, whereby said reinforcement member restrains decambering of said blade beyond said acute angle.

2. The improvement claimed in claim 1 in which said radially spaced positions are spaced more than 50% of the blade radial extent.

3. The improvement claimed in claim 1 in which said blade is connected to said arm at said acute angle.

4. The improvement claimed in claim 1 in which said reinforcement member is connected against said blade in one plane and, adjacent said connection to said blade and rearwardly thereof, is bent upstream and then rearwardly and extends therefrom transversely rearwardly at said acute angle in a second plane spaced upstream from said one plane.

5. The improvement claimed in claim 4 in which said blade is connected to said arm at said acute angle.

6. The improvement claimed in claim 5 in which said one and said second planes are parallel.

7. The improvement claimed in claim 6 in which said reinforcement member comprises a continuous web extending radially along said blade leading portion and, integral with said member, a plurality of integral radially spaced fingers transversely extending toward said blade trailing position, said trailing position along said line thereby interrupted by the space between said fingers.

8. The improvement claimed in claim 7 in which said distance is on the order of about 70%.

9. The improvement claimed in claim 1 in which said reinforcement member comprises a continuous web extending radially along said blade leading portion and, integral with said member, a plurality of integral radially spaced fingers transversely extending toward said blade trailing position, said trailing position along said line thereby interrupted by the space between said fingers.

10. The improvement claimed in claim 1 in which said distance is on the order of about 70%.

11. In the combination of a viscous shear clutch and an automotive cooling fan, said fan having a hub and a plurality of fan blade assemblies each comprising an arm extending radially outwardly from said hub and a flexible resilient blade having a leading portion, defined by the direction of fan rotation, extending radially along said arm and connected to said arm radially therealong, said blade having radially spaced inner and outer side edges and extending transversely to a trailing portion thereof terminating in a trailing edge spaced rearwardly of said arm and said blade curved from said arm to a position at said trailing edge downstream of said arm, relative to the direction of airflow from said fan, said blade presenting a transversely extending convex surface on the upstream side thereof, said trailing portion and said trailing edge decambering to a relatively more upstream position as rotational speed increases, and a rigid reinforcement member radially connected to and against the upstream side of said blade leading portion, said reinforcement member extending radially along said leading portion and transversely therefrom toward said blade trailing portion overlying said convex surface, said reinforcement member spaced a progressively greater distance from said blade convex surface toward the trailing portion of said blade, the improvement in which:

said reinforcement member extends transversely, at an acute angle to said plane, to a trailing position along a line extending generally radially along said blade and said reinforcement member at radially spaced positions along said line respectively adjacent said inner and outer side edges, said line spaced transversely from the connection of said reinforcement member to said blade a distance greater than 50% of the transverse extent of said blade to said blade trailing edge from said connection, whereby said reinforcement member restrains decambering of said blade beyond said acute angle.

12. The improvement claimed in claim 11 in which said blade is connected to said arm at said acute angle.

13. The improvement claimed in claim 12 in which said reinforcement member comprises a continuous web extending radially along said blade leading portion and, integral with said member, a plurality of integral radially spaced fingers transversely extending toward said blade trailing position, said trailing position along said line thereby interrupted by the space between said fingers.

14. The improvement claimed in claim 13 in which said distance is on the order of about 70%.

15. The improvement claimed in claim 14 in which said radially spaced positions are spaced more than 50% of the blade radial extent.

* * * * *